(12) United States Patent  
Chapuis (10) Patent No.: US 7,565,559 B2
(45) Date of Patent: Jul. 21, 2009

(54) METHOD AND SYSTEM FOR COMMUNICATING FILTER COMPENSATION COEFFICIENTS FOR A DIGITAL POWER CONTROL SYSTEM

(75) Inventor: Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 11/778,647

(22) Filed: Jul. 17, 2007

(65) Prior Publication Data

US 2008/0186006 A1 Aug. 7, 2008

Related U.S. Application Data

(60) Division of application No. 10/889,806, filed on Jul. 12, 2004, now Pat. No. 7,249,267, and a continuation-in-part of application No. 10/361,667, filed on Feb. 10, 2003, now Pat. No. 6,933,709, and a continuation-in-part of application No. 10/326,222, filed on Dec. 21, 2002, now Pat. No. 7,000,125.

(60) Provisional application No. 60/544,553, filed on Feb. 12, 2004.

(51) Int. Cl.
*G06F 1/26* (2006.01)
(52) U.S. Cl. ........................... 713/300; 323/234
(58) Field of Classification Search ........... 323/222, 323/268, 266, 271, 272, 282–286; 363/65, 363/97, 41; 375/285, 297, 345; 713/300
See application file for complete search history.

(56) References Cited

U.S. PATENT DOCUMENTS 3,660,672 A 5/1972 Berger et al.

(Continued)

FOREIGN PATENT DOCUMENTS

CN 2521825 11/2002

(Continued)

OTHER PUBLICATIONS

Microturbine Power Conversion Technology Review, Staunton et al.; Oak Ridge National Laboratory Technical Report; Apr. 8, 2003; 40 pages.

(Continued)

*Primary Examiner*—Rajnikant B Patel
(74) *Attorney, Agent, or Firm*—O'Melveny & Myers LLP (57) ABSTRACT

A method and system is provided for programming the digital filter compensation coefficients of a digitally controlled switched mode power supply within a distributed power system. The distributed power system comprises a plurality of point-of-load (POL) regulators each comprising at least one power switch adapted to convey power to a load and a digital controller adapted to control operation of the power switch responsive to a feedback measurement. The digital controller further comprises a digital filter having a transfer function defined by plural filter coefficients. A serial data bus operatively connects each of the plurality of POL regulators. A system controller is connected to the serial data bus and is adapted to communicate digital data to the plurality of POL regulators via the serial data bus. The digital data includes programming data for programming the plural filter coefficients. The system controller further comprises a user interface adapted to receive the programming data therefrom.

14 Claims, 6 Drawing Sheets

U.S. PATENT DOCUMENTS

| | | |
|---|---|---|
| 4,194,147 A | 3/1980 | Payne et al. |
| 4,204,249 A | 5/1980 | Dye et al. |
| 4,328,429 A | 5/1982 | Kublick et al. |
| 4,335,445 A | 6/1982 | Nercessian |
| 4,350,943 A | 9/1982 | Pritchard |
| 4,451,773 A | 5/1984 | Papathomas et al. |
| 4,538,073 A | 8/1985 | Freige et al. |
| 4,538,101 A | 8/1985 | Shimpo et al. |
| 4,607,330 A | 8/1986 | McMurray et al. |
| 4,616,142 A | 10/1986 | Upadhyay et al. |
| 4,622,627 A | 11/1986 | Rodriguez et al. |
| 4,630,187 A | 12/1986 | Henze |
| 4,654,769 A | 3/1987 | Middlebrook |
| 4,677,566 A | 6/1987 | Whittaker et al. |
| 4,761,725 A | 8/1988 | Henze |
| 4,940,930 A | 7/1990 | Detweiler |
| 4,988,942 A | 1/1991 | Ekstrand |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,168,208 A | 12/1992 | Schultz et al. |
| 5,229,699 A | 7/1993 | Chu et al. |
| 5,270,904 A | 12/1993 | Gulczynski |
| 5,272,614 A | 12/1993 | Brunk et al. |
| 5,287,055 A | 2/1994 | Cini et al. |
| 5,349,523 A | 9/1994 | Inou et al. |
| 5,377,090 A | 12/1994 | Steigerwald |
| 5,398,029 A | 3/1995 | Toyama et al. |
| 5,426,425 A | 6/1995 | Conrad et al. |
| 5,481,140 A | 1/1996 | Maruyama et al. |
| 5,489,904 A | 2/1996 | Hadidi |
| 5,508,606 A | 4/1996 | Ryczek |
| 5,532,577 A | 7/1996 | Doluca |
| 5,610,826 A | 3/1997 | Whetsel |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,684,686 A | 11/1997 | Reddy |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawa |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,005,377 A | 12/1999 | Chen et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,111,396 A | 8/2000 | Line et al. |
| 6,115,441 A | 9/2000 | Douglass et al. |
| 6,121,760 A | 9/2000 | Marshall et al. |
| 6,136,143 A | 10/2000 | Winter et al. |
| 6,137,280 A | 10/2000 | Ackermann |
| 6,150,803 A | 11/2000 | Varga |
| 6,157,093 A | 12/2000 | Giannopoulos et al. |
| 6,157,182 A | 12/2000 | Tanaka et al. |
| 6,160,697 A | 12/2000 | Edel |
| 6,163,143 A | 12/2000 | Shimamori |
| 6,163,178 A | 12/2000 | Stark et al. |
| 6,170,062 B1 | 1/2001 | Henrie |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,856 B1 | 2/2001 | Kobayashi et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,246,219 B1 | 6/2001 | Lynch et al. |
| 6,249,111 B1 | 6/2001 | Nguyen |
| 6,262,900 B1 | 7/2001 | Suntio |
| 6,288,595 B1 | 9/2001 | Hirakata et al. |
| 6,291,975 B1 | 9/2001 | Snodgrass |
| 6,294,954 B1 | 9/2001 | Melanson |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burnstein et al. |
| 6,355,990 B1 | 3/2002 | Mitchell |
| 6,366,069 B1 | 4/2002 | Nguyen et al. |
| 6,373,334 B1 | 4/2002 | Melanson |
| 6,385,024 B1 | 5/2002 | Olson |
| 6,392,577 B1 | 5/2002 | Swanson et al. |
| 6,396,169 B1 | 5/2002 | Voegeli et al. |
| 6,396,250 B1 | 5/2002 | Bridge |
| 6,400,127 B1 | 6/2002 | Giannopoulos |
| 6,411,071 B1 | 6/2002 | Schultz et al. |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,448,746 B1 | 9/2002 | Carlson |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,614,612 B1 * | 9/2003 | Menegoli et al. ......... 360/73.03 |
| 6,621,259 B2 | 9/2003 | Jones et al. |
| 6,665,525 B2 | 12/2003 | Dent et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,778,414 B2 | 8/2004 | Chang et al. |
| 6,788,033 B2 | 9/2004 | Vinciarelli |
| 6,788,035 B2 | 9/2004 | Bassett et al. |
| 6,791,298 B2 | 9/2004 | Shenai et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,825,644 B2 | 11/2004 | Kernahan et al. |

| | | |
|---|---|---|
| 6,828,765 B1 | 12/2004 | Schultz et al. |
| 6,829,547 B2 | 12/2004 | Law et al. |
| 6,833,691 B2 | 12/2004 | Chapuis |
| 6,850,046 B2 | 2/2005 | Chapuis |
| 6,850,049 B2 | 2/2005 | Kono |
| 6,850,426 B2 | 2/2005 | Kojori et al. |
| 6,853,169 B2 | 2/2005 | Burstein et al. |
| 6,853,174 B1 | 2/2005 | Inn |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |
| 6,933,709 B2 | 8/2005 | Chapuis |
| 6,933,711 B2 | 8/2005 | Sutardja et al. |
| 6,936,999 B2 | 8/2005 | Chapuis |
| 6,947,273 B2 | 9/2005 | Bassett et al. |
| 6,949,916 B2 | 9/2005 | Chapuis |
| 6,963,190 B2 | 11/2005 | Asanuma et al. |
| 6,965,220 B2 | 11/2005 | Kernahan et al. |
| 6,965,502 B2 | 11/2005 | Duffy et al. |
| 6,975,494 B2 | 12/2005 | Tang et al. |
| 6,977,492 B2 | 12/2005 | Sutardja et al. |
| 7,000,125 B2 | 2/2006 | Chapuis et al. |
| 7,000,315 B2 | 2/2006 | Chua et al. |
| 7,007,176 B2 | 2/2006 | Goodfellow et al. |
| 7,023,192 B2 | 4/2006 | Sutardja et al. |
| 7,023,672 B2 | 4/2006 | Goodfellow et al. |
| 7,049,798 B2 | 5/2006 | Chapuis et al. |
| 7,068,021 B2 | 6/2006 | Chapuis |
| 7,080,265 B2 | 7/2006 | Thaker et al. |
| 7,141,956 B2 | 11/2006 | Chapuis |
| 7,266,709 B2 | 9/2007 | Chapuis et al. |
| 7,315,157 B2 | 1/2008 | Chapuis |
| 7,315,160 B2 | 1/2008 | Fosler |
| 7,394,445 B2 | 7/2008 | Chapuis et al. |
| 2001/0052862 A1 | 12/2001 | Roelofs |
| 2002/0070718 A1 | 6/2002 | Rose |
| 2002/0073347 A1 | 6/2002 | Zafarana et al. |
| 2002/0075710 A1 | 6/2002 | Lin |
| 2002/0104031 A1 | 8/2002 | Tomlinson et al. |
| 2002/0105227 A1 | 8/2002 | Nerone et al. |
| 2002/0144163 A1 | 10/2002 | Goodfellow et al. |
| 2003/0006650 A1 | 1/2003 | Tang et al. |
| 2003/0067404 A1 | 4/2003 | Ruha et al. |
| 2003/0122429 A1 | 7/2003 | Zhang |
| 2003/0137912 A1 | 7/2003 | Ogura |
| 2003/0142513 A1 | 7/2003 | Vinciarelli |
| 2003/0201761 A1 | 10/2003 | Harris |
| 2004/0080044 A1 | 4/2004 | Moriyama et al. |
| 2004/0093533 A1 | 5/2004 | Chapuis et al. |
| 2004/0123164 A1 | 6/2004 | Chapuis et al. |
| 2004/0123167 A1 | 6/2004 | Chapuis |
| 2004/0174147 A1 | 9/2004 | Vinciarelli |
| 2004/0178780 A1 | 9/2004 | Chapuis |
| 2004/0189271 A1 | 9/2004 | Hanson et al. |
| 2004/0201279 A1 | 10/2004 | Templeton |
| 2004/0225811 A1 | 11/2004 | Fosler |
| 2004/0246754 A1 | 12/2004 | Chapuis |
| 2005/0093594 A1 | 5/2005 | Kim et al. |
| 2005/0117376 A1 | 6/2005 | Wilson |
| 2005/0146312 A1 | 7/2005 | Kenny et al. |
| 2005/0200344 A1 | 9/2005 | Chapuis |
| 2005/0289373 A1 | 12/2005 | Chapuis et al. |
| 2006/0022656 A1 | 2/2006 | Leung et al. |
| 2006/0149396 A1 | 7/2006 | Templeton |
| 2006/0174145 A1 | 8/2006 | Chapuis et al. |
| 2006/0244570 A1 | 11/2006 | Leung et al. |
| 2006/0250120 A1 | 11/2006 | King |
| 2007/0114985 A1 | 5/2007 | Latham et al. |

FOREIGN PATENT DOCUMENTS

| | | |
|---|---|---|
| EP | 0255258 | 2/1988 |
| EP | 0315366 | 5/1989 |
| EP | 0401562 | 12/1990 |
| EP | 0660487 | 6/1995 |
| EP | 0875994 | 11/1998 |
| EP | 0877468 | 11/1998 |
| EP | 0997825 | 5/2000 |
| GB | 2377094 | 12/2002 |
| JP | 60-244111 | 12/1985 |
| JP | 1185329 | 3/1999 |
| KR | 200284495 | 8/2002 |
| RU | 1359874 | 12/1985 |
| RU | 1814177 | 5/1993 |
| WO | WO93/19415 | 9/1993 |
| WO | WO01/22585 | 3/2001 |
| WO | WO02/31943 | 4/2002 |
| WO | WO02/31951 | 4/2002 |
| WO | WO02/50690 | 6/2002 |
| WO | WO02/063688 | 8/2002 |
| WO | WO 03/030369 | 4/2003 |

OTHER PUBLICATIONS

Microcomputer Control of DC/DC Converters for Photovoltaic Applications, Peracaula et al.; Dept. of Electronics Engineering, Industrial Electronics Group—Technical University of Catalonia, Spain; 1991; 4 pgs.

"MicroSCADA Technology Rev. 8.4.2 Documentation CD: Application Objects, Chapter 5. Data Objects", CD-ROM; Sep. 18, 1998, ABB, XP002481365; 11 pages.

"Modern User Interface Revolutionizes Supervisory Systems", D'Armour et al.; IEEE Computer Applications in Power; vol. 7, No. 1; Jan. 1, 1994; pp. 34-39.

"Open Architecture Distributed Processing—The Modern Design for Electric Power Network Automation", Hissey et al.; IEEE Region 9 Colloquium; Sep. 1990; pp. 150-161; XP010038436.

I2C-Bus Specification, The, Version 2.1, Jan. 1, 2000; Document Order No. 9398 393 40011, pp. 1-46.

25 Watt DC-DC Converters, Melcher The Power Partners and Power-One Group of Companies, Industrial Environment, Apr. 4, 1999, DC-DC Converters <40 Watt, G Series, 16 pages.

–48V Programmable Hot Swap Sequencing Power Controller, Summit Microelectronics, Inc., Oct. 30, 2002, SMH4804, 41 Pages.

33702 Microprocessor Power Supply (3.0A), Analog Products MC33702 Fact Sheet; Motorola/Digital dna/Power Management Switchings; Jan. 1, 2003, pp. 1-4.

Accelerator-Control-System Interface for Intelligent Power Supplies, S. Cohen, Los Alamos National Laboratory, Jan. 1, 1992, pp. 183-186.

Advanced Configuration and Power Interface Specification, Intel Corporation, Microsoft Corporation, Toshiba Corp, Feb. 2, 1999, Revision 1.0b, 387 Pages.

Advantages of Microcontrollers in DC-DC Converters, Galaxy Power, Jan. 1, 2003 IBM Symposium, Real Solutions for Distributed Power, 8 Pages.

Agilent E364xA Single Output DC Power Supplies, User's Guide; Agilent Technologies, Part No. E3640-90001, Jan. 1, 2000, 207 pages.

Agilent E3640A-E3649A Programmable dc Power Supplies, Data Sheet; Agilent Technologies, Jan. 1, 2000, 4 pages.

Architecture and IC implementation of a digital VRM controller, Jinwen, Xiao et al, 32nd Annual IEEE Power Electronics Specialists Conference. PESC 2001. Conference Proceedings. Vancouver, Canada, Jun. 17-21, 2001, Annual Power Electronics Specialists Conference, New York, NY : IEEE, US, vol. vol. 1 of 4. Conf. 32, Jun. 17, 2001, pp. 38-47, XP010559121 ISBN: 0-7803-7067-8, figure 7.

Automating the Design of a Generic Modular Power System for the Global Market, Pedersen, George, Briggs, Steve; Massey, Paul, Advance Power Raynham Road, Bishops Stortford, Herts.; Jan. 1, 1999, CM23 5PF UK.

Auto Sequence Programming Examples for GPIB-M, Xantrex Technology, Inc., Nov. 27, 2002, 1.0a, 4 pages.
BE510 / BE510S Modules—Bipolar DC Source from 100mV to 20V and from 100nA to 4A, Innovative Test Systems; BE510 Version II, Issue 9, Nov. 12, 2000, 3 pages.
BE52x Modules—Multi-range bipolar DC sources from 30V to 500V, 90W, Innovative Test Systems; BE52x Version A, Issue 9, Aug. 3, 2001, 3 pages.
Characteristics of Automated Power System Monitoring & Management Platforms, Hawkins, John M.; Telepower Australia Pty Ltd, Jan. 1, 2000, telepower@telepower.com.au, IEEE, Intelec, 5 Pages.
Chemistry-Independent Battery Chargers, Maxim Integrated Products, Dec. 1, 2002, 19-1158, Rev 1, MAX1647/MAX1648, 25 Pages.
Continuing Evolution of Intelligence for Telecommunications Power Plants, The, Godby, Jimmy, Apr. 1, 1996, IEEE, 0-7803-3507-4/96, pp. 70-75.
Controlling and Alarming DC Power Plants via the Internet, Cosentino, Anthony P.; Sullivan, Michael C.; Baxter, Richard V. Jr.; Loeck, JonPower Conversion Products, LLC and Pensar Corporation, Jan. 1, 1998, 6 pages.
Current-Fed Multiple-Output Power Conversion, Seamus O'Driscoll; John G. Hayes and Michael G. Egan; Artesyn Technologies; Dept. of Electrical Engineering, University College Cork, Ireland, Dec. 3, 2003, 7 pages.
DALI Manual, DALI AG, Digital Addressable Lighting Interface Activity Group, ZVEI-Division Luminaries, Jan. 1, 2001, pp. 1-62.
Defendent's Artesyn Technologies, Inc.'s Preliminary Invalidity Contentions—(*Power-One, Inc.* vs. *Artesyn Technologies, Inc. et al.*), Civil Action No. 2-05-CV-463 (LED), United States District Court for the Eastern District of Texas; Apr. 26, 2006.
DHP Series DC Power Supplies, IEEE 488.2/RS-232 Options Programming Manual; Sorensen, Division of Elgar Electronics Corporation, Document No. M550005-01 Rev B, Jul. 29, 2002, 32 pages.
Digital Addressable Lighting Interface (DALI): An Emerging Energy-Conserving Lighting Solution, The, Ronat, Odile; International Rectifier, Apr. 9, 2002, TP4/9/2002. pp. 1-6.
Digital Multiphase Power from Primarion and Intersil Changing the Landscape of Processor Power, Primarion, Inc., White Paper, Sep. 12, 2002, 6 pages.
Digitally Controlled Power Systems: How Much Intelligence is Needed and Where it Should be, Lock, Tom; RELTEC Corporation, Jan. 1, 1998, IEEE, 4 pages.
Digitally-Controlled SMPS Extends Power System Capabilities, Vinsant, Ron; DiFiore, John; Clarke, Richard, PCIM, Jun. 1, 1994, pp. 30-37.
Digitally Controlled Zero-Voltage-Switched Fullbridge Converter, A, Rinne, Karl-Heinz; Theml, Klaus; Duigan, Joseph; McCarthy, Oliver, Power Conversion, Jun. 1, 1994 Proceedings, pp. 317-324.
Distributed Intelligence and Modular Architecture for Next Generation DC Power System, Duguay, Louis; Got, Pierre, Astec Advanced Power Systems, Quebec, Canada; Jan. 1, 2000, 6 pages.
Distributed Power Hot Swap Controller, Summit Microelectronics, Inc., Mar. 19, 2001, SMH4804; 2050 2.3, 32 pages.
Dual 550kHz Synchronous 2-Phase Switching Regulator Controller, Linear Technology, Jan. 1, 1998, LTC1702, 36 Pages.
Dual Smart Card Interface TDA8020HL, Philips Semiconductors, Integrated Circuits, Data Sheet, Feb. 24, 2001, I2C Bus,TDA8020HL, Objective Specification v4.2 Supersedes data of Jan. 2001 File under Integrated Circuits, ICXX, 22 Pages.
Dual Smart Card Interface TDA8020HL/C2, Christophe Chausset, Philips Semiconductors, May 20, 2003, Application Note, TDA8020HL/C2, AN10232, 28 Pages.
Electronic Products Power Supply Special: Programmable Supplies Use Switch-Mode Topologies, Birman, Paul; Nercessian, Sarkis; Kepco, Inc. Flushing NY; vol. 37, No. 10, Electronic Products, Mar. 1, 1995; The Engineer's Magazine of Product Technology; Power Supply Special; DSO Samples Single Shots at 10 Gsamples/s Speech Recognition On A Single Chip LCD Has Flat-Panel Benefits At CRT Cost Product Update: High-Performance OP AMPS; A Hearst Business Publication; pp. 1, 5, 33-34.
Fieldbus System Engineering Guidelines, Fieldbus Foundation, 2003-2004, pp. 1-94.

High Efficiency, 2-Phase Synchronous Step-Down Switching Regulators, Linear Technology, Jan. 1, 1998, LTC1628/LTC1628-PG, 32 Pages.
High Efficiency Synchronous Step-Down Switching Regulator, Linear Technology, Jan. 1, 1998, LTC1735, 33 Pages.
High-frequency digital controller IC for DC/DC converters, Patella B J et al; APEC 2002. 17th. Annual IEEE Applied Power Electronics Conference and Exposition. Dallas, TX, Mar. 10-14, 2002, Annual Applied Power Electronics Conference, New York, NY : IEEE, US, vol. vol. 2 of 2. Conf. 17, Mar. 10, 2002, pp. 374-380, XP010582947, ISBN: 0-7803-7404-5, p. 375, right-hand column; figure 3.
Highly Programmable Voltage Supply Controller and Supervisory Circuit, Summit Microelectronics, Inc., Jun. 7, 2001, SMS44, Preliminary, 19 Pages.
IEEE Standard Codes, Formats, Protocols, and Common Commands for User with IEEE Std 488.1-1987, IEEE Standard Digital Interface for Programmable Instrumentation, IEEE Std 488.2-1992; IEEE, Jun. 18, 1992, ISBN 1-55937-238-9, 254 pages.
IMPI Intelligent Platform Management Bus Communications Protocol Specification v1.0, Intel, Hewlett-Packard, NEC, Dell, Document Revision 1.0, Nov. 15, 1999, 39 pages.
Implementing a Nationwide Energy Management System, Sjöberg, Stig; Hedberg, Tommy; Selberg, Lars; Wikström, Rober, Jan. 1, 2000.
Infinite Impulse Response, Wikipedia, http://en.wikipedia.org/wiki/IIR, May 2, 2006, pp. 1-4.
In-Situ Transfer Function Analysis, 2006 Digital Power Forum Presentation; Mark Hagen, Texas Instruments Digital Power Group, Jul. 1, 2006.
Installation Guide MPS Mainframe Model 66000A, Agilent Technologies, Agilent Part No. 66000-90001, 1991-Apr. 2000, 26 pages.
In-System Network Analyzer, 2006 Digital Power Forum Prensentaiton, Silicon Laboratories, Jul. 7, 2006.
Integrate Internet Solutions Into Your Energy Management Network, Sarkinen, Johan; Lundin, Ola; Jun. 1, 1998, 7 pages.
Integrity-One: Installation, Operation and Maintenance Manual, Power-One, Inc., 1999-2003 Version 1.2 (P025374-P025559).
Integrity-One Power System—Rack System, Data Sheet, Power-One, Inc., Nov. 1, 2002, (P025580-P025583).
Intelligent, Fault Tolerant, High Power, Distributed Power System for Massively Parallel Processing Computers, An, Burns, J.; Riel, J.; DiBene, T., IEEE, May 1, 1994, 0-7803-1456-5/94, pp. 795-798.
Intelligent Platform Management Interface Specification v1.5, Intel, Hewlett-Packard, NEC, Dell, Document Revision 1.1, Feb. 20, 2002, 459 pages.
Intelligent Power Supply Controller, Rumrill, R.S.; Reinagel, D.J.; IEEE, Aug. 1, 1991, 0-7803-0135-8/91, PAC 1991, pp. 1537-1539.
KEKB Power Supply Interface Controller Module, Akiyama, Nakamura, Yoshida, Kubo, Yamamoto, Katoh; High Energy Accelerator Research Organization, 1-1 Ohio, Tsukuba 305, Japan; International Conference on Accelerator and Large Experimental Physics and Control Systems, Jan. 1, 1997, Beijing, China 4 pgs.
Low Voltage Study Workshop Report, Charles E. Mullett; Lou Pechi; PSMA, Power Sources Manufacturers Association, The Multinational Power Electronics Association, Jan. 1, 2001, 150 Pages.
Magnet Power Supply Control System in KEKB Accelerators, Akiyama, Katoh, Kubo, Yamamoto, Yoshida; KEK, Tsukuba, Japan; International Conference on Accelerator and Large Experimental Physics and Control Systems, Jan. 1, 1999, Triest, Italy pp. 406-408.
Magnet Power Supply as a Network Object, Cohen, S.; Stuewe, R.; IEEE, Aug. 1, 1991, 0-7803-0135-8/91, PAC 1991, pp. 929-931.
Market Trends Toward Enhanced Control of Electronic Power Systems, Miles, F.M.; Danak, R.K.; Wilson, T.G.; Suranyi, G.G.; IEEE, Jan. 1, 1993, 0-7803-0982-0/93, pp. 92-98.
Memorandum Opinion and Order, *Power One* v. *Artesyn Technologies, Inc.*; Civil Action 2:05cv463, Mar. 22, 2007.
Microchip AN811, The RS-232/DALI Bridge Interface, Microchip Technology, Inc., Jan. 1, 2002, DS00811A, pp. 1-8.
Microchip AN809, Digitally Addressable DALI Dimming Ballast, Microchip Technology Inc., Jan. 1, 2002, DS00809B, pp. 1-18.
Microchip AN703, Using the MCP320X 12-Bit Serial A/D Converter with Microchip PICmicro® Devices, Microchip Technology Inc., Jan. 1, 2002, DS00703A, pp. 1-25.

Microchip PIC16C781/782 Data Sheet, 8-bit CMOS Microcontrollers with A/D, D/A, OPAMP, Comparators and PSMC, Microchip Technology Inc., Jan. 1, 2001, pp. 1-184.

Microprocessor Core Supply Voltage Set by 1 2 C Bus Without VID Lines—Design Note 279, Mark Gurries; Linear Technology—Design Notes, Jan. 7, 2002, 2 pages.

Power LAN for Telecommunication Power Supply Equipment, A, Vun C.H., Nicholas; C.T., Lau; B.S., Lee; IEEE TENCON '93 Beijing, Jan. 1, 1993, pp. 24-27.

Power Management Solutions for Networking Applications, Darmon, Luc; Smart Networks Developer Forum 2003, Jun. 4-6, 2003, Euro-Disney Paris, France, Motorola digital dna; pp. 1-26; www.motorola.com/sndf.

Power System Controller in an Intelligent Telecom Rectifier Plant, Roth, Ueli; IEEE, Aug. 1, 1992, 0-7802-0779-8/92, pp. 476-483.

Preliminary Information 1.5A Switch-Mode Power Supply with Linear Regulator, 33701; Power Supply Integrated Circuit; Motorola Seminconductor Technical Data; Analog Marketing MC33701/D Rev. 1.0, May 1, 2003; Motorola digial dna; pp. 1-24.

Presenting DALI, AG DALI, Jul. 1, 2003, pp. 1-17.

Programmable Four-Channel Step-Down DC/DC Converter, Texas Instruments, Oct. 1, 2001, TPS54900, 16 Pages.

Programming Guide Series 661xxA MPS Power Modules, Agilent Technologies, Agilent Part No. 5959-3362, 1991-2000, 114 pages.

Programmer Manual, PS2520G & PS2521G Programmable Power Supplies, Tektronix, 070-9197-00, Jan. 1, 1995, 70 pages.

Power Management for Communications: Product Information, Summit Microelectronics, Inc., Jan. 23, 2001, 168 Pages, http://www.summitmicro.com.

Power Management for Communications: Corporate Overview, Summit Microelectronics, Inc., Oct. 1, 2002, 213 Pages.

Power Semiconductors and Power Supplies—The Building Blocks of the Digital Power Revolution, Todd Cooper and Holman Harvey; Stephens, Inc. Investment Bankers, Sep. 1, 2000, 132 Pages.

Quad Tracking Power Supply Manager, Summit Microelectronics, Inc., Mar. 4, 2002, SMT4004, 35 Pages.

Quantization Resolution and Limit Cycling in Digitally Controlled PWM Converters, Peterchev, Angel V.; Sanders, A. V.; Electrical Engineering and Computer Science; UC Berkley; Power Electronics Specialists Conference, 2001.PESC, vol. 2, Jun. 17-21, 2001; pp. 465-471; XP002274573.

R Option, S Option DC Power Supplies, IEEE 488.2/RS-232 Programming Manual; Power Ten, Document No. M550013-01 Rev C, Jun. 25, 2002, 56 pages.

SCPI Programming Examples for GPIB-M, Xantrex Technology, Inc., Nov. 26, 2002, 1.0, 3 pages.

Service Guide for Agilent 6610xA Power Modules, Agilent Technologies, Agilent Part No. 5959-3364, Dec. 1, 2002, 101 pages.

Silicon Labs Preliminary Invalidity Contentions, Civil Action No. 2-05-CV-463 (LED)—May 26, 2006 (U.S. District Court Eastern District of Texas).

Simple digital hardware to control a PFC converter, A, Zumel P et al; IECON'01. Proceedings of the 27th. Annual Conference of the IEEE Industrial Electronics Society. Denver, CO, Nov. 29-Dec. 2, 2001, Annual Conference of the IEEE Industrial Electronics Society, New York, NY : IEEE, US, vol. vol. 1 of 3. Conf. 27, Nov. 29, 2001, pp. 943-948, XP010572905 ISBN: 0-7803-7108-9, paragraph [IIIC].

Single-Inductor Multiple-Output Switching Converters, Wing-Hung Ki and Dongsheng Ma; Integrated Power Electronics Laboratory, Department of Electrical and Electronic Engineering, The Hong Kong University of Science and Technology, Clear Water Bay, Hong Kong SAR, China, Jan. 1, 2001, 6 pages.

Six-Channel Power Supply Supervisor and Cacsade Sequence Controller, Summit Microelectronics, Inc., Jul. 16, 2003, SMS66, Preliminary Information, 26 pages.

SMBus Controls CPU Voltage Regulators without VID Pins, Mark Gurries, Design Ideas, Linear Technology Magazine, Sep. 1, 2001, 2 Pages.

SMBus VID Voltage Programmers, Linear Technology, Jan. 1, 2001, LTC1699 Series, 20 Pages.

SMH 4804, SMP9210 and SMT4004 Telecom Reference Design, Summit Microelectronics, Inc., Sep. 5, 2002, Application Note 25, 17 Pages.

Synchronization of Multiple Voltage Regulator Outputs, Mueller, M.W.; et al., IBM Technical Disclosure Bulletin, Jun. 1, 1999; 2 pages.

System Management Bus (SMBus) Specification Version 2., Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.

System Management Bus Specification, Revision 1.1, Smart Battery System Specifications, Revision 1.1, Dec. 11, 1998; Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG. 39 pgs.

Technical Overview, Foundation™ fieldbus, Freedom to Choose. Power to Integrate, Fieldbus Foundation, Jan. 1, 2003, FD-043 Rev 3.0, pp. 1-37.

Testing Intelligent Power Supplies for the Los Alamos National Laboratory Accelerator Complex, Sturrock, J.C. ; Cohen, s.; Weintraub, B.L.; Hayden, D.J.; Archuletta, S.F. ; Los Alamos National Laboratory, Jan. 1, 1992, pp. 217-219.

Uniform Language for Accessing Power Plants—Human-Machine Language, ANSI T1.317-1993; American National Standards Institute, Dec. 14, 1993, 55 pages.

User's Guide Series 661xxA MPS Power Modules & Model 66001A MPS Keyboard, Agilent Technologies, Agilent Part No. 5959-3386, 1992-Apr. 2000, 53 pages.

User Manual, PS2520, PS2520G, PS2521 & PS2521G Programmable Power Supplies, Tektronix, 070-9196-00, Jan. 1, 1995, 56 pages.

Volume 1: Syntax and Style, SCPI Consortium, May 1, 1999, Version 1999.0, 67 pages.

Volume 1: Syntax and Style, Standard Commands for Programmable Instruments (SCPI) Consortium, May 1, 1997, Version 1997.0, 68 pages.

Volume 2: Command Reference, SCPI Consortium, May 1, 1999, Version 1999.0, 565 pages.

Volume 2: Command Reference, SCPI Consortium, May 1, 1997, Version 1997.0, 506 pages.

Volume 3: Data Interchange Format, SCPI Cosortium, May 1, 1999, Version 1999.0, 72 pages.

Volume 3: Data Interchange Format, SCPI Consortium, May 1, 1997, Version 1997.0, 73 pages.

Volume 4: Instrument Classes, SCPI Consortium, May 1, 1999, Version 1999.0, 115 pages.

Volume 4: Instrument Classes, SCPI Consortium, May 1, 1997, Version 1997.0, 58 pages.

VXI Bus Programmable DC Power Supplies, Advanced Power Designs, Inc., Irvine, CA; Jan. 1, 1993, 5 pages.

Why have Monitoring?, Shawyer, P.; Hobbs, P.; McLeod, A.; Jan. 1, 2001, 8 Pages.

Wide Operating Range, No Sense Step-Down Controller, Linear Technology, Jan. 1, 2001, LTC1778/LTC1778-1, 24 Pages.

Wide Operating Range, No Sense Step-Down DC-DC Controller with SMBus Programming, Linear Technology, Jan. 1, 2001, LTC1909-8, 34 Pages.

Motorola Switch Mode Power Supply with Multiple Linear Regulators and High Speed CAN Transceiver, Motorola, Inc. 2002; digital dna; Analog Marketing; Rev. 2.5, Nov. 1, 2002; 33394; Multi-Output Power Supply Semiconductor Technical Data.

NEBS Compliant Board Level Power System, Thomas J. DeLurio, Mikhail Guz and John Ng; Summit Microelectronics, Power One, Oct. 20, 2002, 7 Pages.

New Applications Demand Programmable Power Supplies/Sources, O'Shea, Paul; http://www.evaluationengineering.com/archive/articles/0997powr.htm, Nelson Publishing, Inc., Jan. 1, 1997, 8 pages.

New Digital Power Delivery Architecture, Bob Carroll, Primarion, Sep. 1, 2004, 5 Pages.

Non-Impact Printer Power and Motor Control System on a Chip, Masson, James; Barrow, Steven; IEEE, Apr. 1, 1995, IEEE Catalogue No. 95TH8025, 0-7803-2423-4/95, pp. 98-103.

Operating and Service Manual MQ Series DC Power Supplies, Magna-Power Electronics, Inc., Dec. 19, 2002, 48 pages.

Operating and Service Manual SBC488A, Magna-Power Electronics, Inc., Dec. 19, 2002, 58 pgs.

Operating and Service Manual SQ Series, DC Power Supplies, Magna-Power Electronics, Inc., Dec. 16, 2002, 48 pgs.

Operating Manual for Internal RS-232 Interface for XT 60 Watt and HPD 300 Watt Series Programmable DC Power Supplies, Xantrex Technology, Inc., Jun. 1, 2002, 59 pages.

Operation and Maintenance Process Model for Energy Management, An, Lundin, Ola; Ericsson Components AB, Energy Systems Division, Jan. 1, 1999, S-164 81 KISTA—Stockholm, Sweden, 7 pages.

Optimizing Power Product Usage to Speed Design Validation Testing, Application Note 1434; Agilent Technologies, Nov. 22, 2002, 16 pages.

PCS Controller, Data Sheet, Power-One, Inc. Nov. 1, 2002 (P025584-P025585).

PCX-150A 150 Amp Pulsed Current Source Operation Manual, Version 3.0, Directed Energy, Inc., Jan. 1, 2001, Document No. 9100-0212 R4, 31 pages.

PMP 25 Rectifier Module, Data Sheet, Power-One, Inc., Undated, (P025602-P025603).

Power Distribution Systems for Future Homes, Lee, Po-Wa; Lee, Yim-Shu; Lin, Bo-Tao; IEEE, Aug. 1, 1999, 0-7803-5769-88/99, pp. 1140-1146.

* cited by examiner

METHOD AND SYSTEM FOR COMMUNICATING FILTER COMPENSATION COEFFICIENTS FOR A DIGITAL POWER CONTROL SYSTEM

RELATED APPLICATION DATA

This patent application is a divisional application pursuant to 35 U.S.C. § 120 to U.S. patent application Ser. No. 10/889,806, filed Jul. 12, 2004, now issued as U.S. Pat. No. 7,249,267 on Jul. 24, 2007, which claims priority to provisional patent application Ser. No. 60/544,553, filed Feb. 12, 2004, and which also claims priority as a continuation-in-part pursuant to 35 § U.S.C. § 120 to patent applications Ser. No. 10/361,667, filed Feb. 10, 2003 now U.S. Pat. No. 6,933,709, and Ser. No. 10/326,222, filed Dec. 21, 2002 now U.S. Pat. No. 7,000,125.

BACKGROUND OF THE INVENTION

1. Field of the Invention

The present invention relates to power supply circuits, and more particularly to digital power control systems and methods for programming parameters of switched mode power supply circuits.

2. Description of Related Art

Switched mode power supplies are known in the art to convert an available direct current (DC) or alternating current (AC) level voltage to another DC level voltage. A buck converter is one particular type of switched mode power supply that provides a regulated DC output voltage to a load by selectively storing energy in an output inductor coupled to the load by switching the flow of current into the output inductor. It includes two power switches that are typically provided by MOSFET transistors. A filter capacitor coupled in parallel with the load reduces ripple of the output current. A pulse width modulation (PWM) control circuit is used to control the gating of the power switches in an alternating manner to control the flow of current in the output inductor. The PWM control circuit uses signals communicated via a feedback loop reflecting the output voltage and/or current level to adjust the duty cycle applied to the power switches in response to changing load conditions.

Conventional PWM control circuits are constructed using analog circuit components, such as operational amplifiers, comparators and passive components like resistors and capacitors for loop compensation, and some digital circuit components like logic gates and flip-flops. But, it is desirable to use entirely digital circuitry instead of the analog circuit components since digital circuitry takes up less physical space, draws less power, and allows the implementation of programmability features or adaptive control techniques.

A conventional digital control circuit includes an analog-to-digital converter (ADC) that converts an error signal representing the difference between a signal to be controlled (e.g., output voltage ($V_o$)) and a reference into a digital signal having n bits. The digital control circuit uses the digital error signal to control a digital pulse width modulator, which provides control signals to the power switches having a duty cycle such that the output value of the power supply tracks the reference. The digital control circuit may further include a digital filter, such as an infinite impulse response (IIR) filter having an associate transfer function. The transfer function includes compensation coefficients that define the operation of the IIR filter. It is desirable to have the ability to alter or program these compensation coefficients in order to define the operation of the digital filter for particular load conditions.

Since electronic systems frequently need power provided at several different discrete voltage and current levels, it is known to distribute an intermediate bus voltage throughout the electronic system, and include an individual point-of-load ("POL") regulator, e.g., a switched mode DC/DC converter, at the point of power consumption within the electronic system. Particularly, a POL regulator would be included with each respective electronic circuit to convert the intermediate bus voltage to the level required by the electronic circuit. An electronic system may include multiple POL regulators to convert the intermediate bus voltage into each of the multiple voltage levels. Ideally, the POL regulator would be physically located adjacent to the corresponding electronic circuit so as to minimize the length of the low voltage, high current lines through the electronic system. The intermediate bus voltage can be delivered to the multiple POL regulators using low current lines that minimize loss.

With this distributed approach, there is a need to coordinate the control and monitoring of the POL regulators of the power system. The POL regulators generally operate in conjunction with a power supply controller that activates, programs, and monitors the individual POL regulators. It is known in the art for the controller to use a multi-connection parallel bus to activate and program each POL regulator. For example, the parallel bus may communicate an enable/disable bit for turning each POL regulator on and off, and voltage identification (VID) code bits for programming the output voltage set-point of the POL regulators. The controller may further use additional connections to monitor the voltage/current that is delivered by each POL regulator so as to detect fault conditions of the POL regulators. A drawback with such a control system is that it adds complexity and size to the overall electronic system.

Thus, it would be advantageous to provide a system and method for digitally controlling a switched mode power supply that overcomes these and other drawbacks of the prior art. It would further be advantageous to provide a system and method for controlling and monitoring the operation of a digitally controlled switched mode power supply within a distributed power system. More particularly, it would be advantageous to provide a system and method for programming the digital filter compensation coefficients of a digitally controlled switched mode power supply within a distributed power system.

SUMMARY OF THE INVENTION

The present invention overcomes the drawbacks of the prior art to provide a system and method for programming the digital filter compensation coefficients of a digitally controlled switched mode power supply within a distributed power system.

In an embodiment of the invention, a power control system comprises a plurality of point-of-load (POL) regulators each comprising at least one power switch adapted to convey power to a load and a digital controller adapted to control operation of the power switch responsive to a feedback measurement. The digital controller further comprises a digital filter having a transfer function defined by plural filter coefficients. A serial data bus operatively connects each of the plurality of POL regulators. A system controller is connected to the serial data bus and is adapted to communicate digital data to the plurality of POL regulators via the serial data bus. The digital data includes programming data for programming the plural filter coefficients. The system controller further comprises a user interface adapted to receive the programming data therefrom.

In another embodiment of the invention, a method of controlling a plurality of point-of-load (POL) regulators is provided. Each POL regulator comprises at least one power switch adapted to convey power to a load and a digital controller adapted to control operation of the power switch responsive to a feedback measurement. The digital controller further comprises a digital filter having a transfer function defined by plural filter coefficients. The method includes the steps of: (a) receiving programming data for programming the plural filter coefficients; (b) transmitting the programming data serially over a common data bus operably connected to the plurality of POL regulators; and (c) programming the plural filter coefficients of respective ones of the POL regulators in accordance with the programming data. More particularly, the receiving step further comprises receiving the programming data from a user.

In yet another embodiment of the invention, a point-of-load regulator comprises a power conversion circuit adapted to convert an intermediate voltage to an output voltage. The power conversion circuit comprises at least one power switch adapted to convey power to a load and a digital controller adapted to control operation of the power switch responsive to a feedback measurement. The digital controller further comprises a digital filter having a transfer function defined by plural filter coefficients. A serial data bus interface is adapted to communicate programming information from an external serial data bus connected thereto. A controller is connected to the serial data bus interface and the power conversion circuit, and is adapted to determine the plural filter coefficients from programming data received via the serial data bus interface.

In yet another embodiment of the invention, a method for programming a power control system is provided. The power control system includes a plurality of point-of-load (POL) regulators each comprising at least one power switch adapted to convey power to a load and a digital controller adapted to control operation of the power switch responsive to a feedback measurement. The digital controller further comprises a digital filter having a transfer function defined by plural filter coefficients. The method comprises: (a) displaying at least one screen simulating operation of an exemplary point-of-load regulator, said at least one screen including user selectable values for characteristics of the exemplary point-of-load regulator; (b) receiving user input to select the user selectable values; (c) calculating digital filter coefficients corresponding to the user input; and (d) selectively communicating data corresponding to the calculated filter coefficients to at least one of the plurality of point-of-load regulators for programming said digital filter.

A more complete understanding of the system and method of communicating filter coefficients to a plurality of point-of-load regulators in a power system will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a method for digitally controlling a switched mode power supply. More particularly, the invention provides a a system and method for programming the digital filter compensation coefficients of a digitally controlled switched mode power supply within a distributed power system. In the detailed description that follows, like element numerals are used to describe like elements illustrated in one or more figures.

Figure 1:
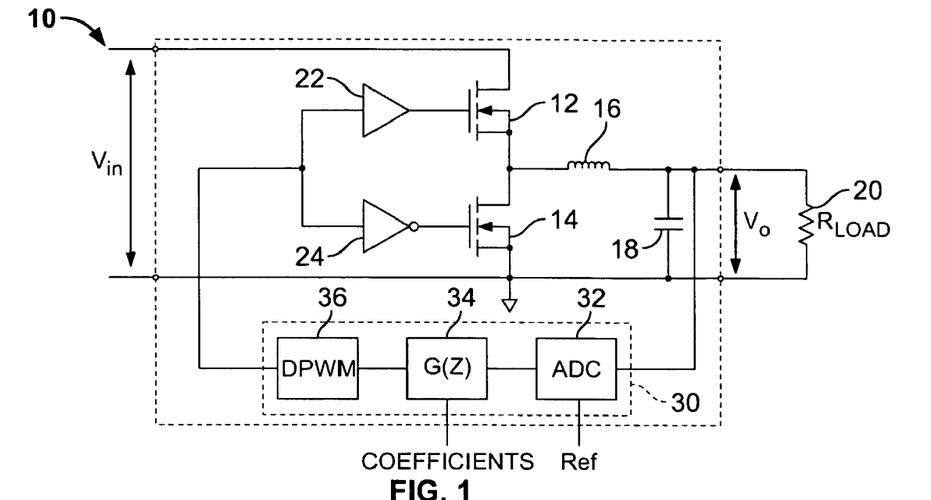
FIG. 1 depicts a switched mode power supply having a digital control circuit.

FIG. 1 depicts an exemplary switched mode power supply 10 having a digital control circuit in accordance with an embodiment of the present invention. The power supply 10 comprises a buck converter topology to convert an input DC voltage $V_{in}$ to an output DC voltage $V_o$ applied to a resistive load 20 ($R_{load}$). The power supply 10 includes a pair of power switches 12, 14 provided by MOSFET devices. The source terminal of the high side power switch 12 is coupled to the input voltage $V_{in}$, the source terminal of the low side power switch 14 is connected to ground, and the drain terminals of the power switches 12, 14 are coupled together to define a phase node. An output inductor 16 is coupled in series between the phase node and the terminal providing the output voltage $V_o$, and a capacitor 18 is coupled in parallel with the resistive load $R_{load}$. Respective drivers 22, 24 alternatingly drive the gate terminals of the power switches 12, 14. In turn, the drivers 22, 24 are controlled by a digital control circuit 30 (described below). The opening and closing of the power switches 12, 14 provides an intermediate voltage having a generally rectangular waveform at the phase node, and the filter formed by the output inductor 16 and capacitor 18 converts the rectangular waveform into a substantially DC output voltage $V_o$.

The digital control circuit 30 receives a feedback signal from the output portion of the power supply 10. As shown in FIG. 1, the feedback signal corresponds to the output voltage $V_o$, though it should be appreciated that the feedback signal could alternatively (or additionally) correspond to the output current drawn by the resistive load $R_{load}$ or any other signal representing a parameter to be controlled by the digital control circuit 30. The feedback path may further include a voltage divider (not shown) to reduce the detected output voltage $V_o$ to a representative voltage level. The digital control circuit 30 provides a pulse width modulated waveform having a duty cycle controlled to regulate the output voltage $V_o$ (or output current) at a desired level. Even though the exemplary power supply 10 is illustrated as having a buck converter topology, it should be understood that the use of feedback loop control of the power supply 10 using the digital control circuit 30 is equally applicable to other known power supply topologies, such as boost and buck-boost converters in both isolated and non-isolated configurations, and to different control strategies known as voltage mode, current mode, charge mode and/or average current mode controllers.

More particularly, the digital control circuit 30 includes analog-to-digital converter (ADC) 32, digital controller 34, and digital pulse width modulator (DPWM) 36. The ADC 32 further comprises a windowed flash ADC that receives as inputs the feedback signal (i.e., output voltage $V_o$) and a voltage reference (Ref) and produces a digital voltage error signal ($VEd_k$) representing the difference between the inputs (Ref–$V_o$). The digital controller 34 has a transfer function G(z) that transforms the voltage error signal $VEd_k$ to a digital output provided to the DPWM 36, which converts the signal into a waveform having a proportional pulse width ($PWM_k$). The digital controller 34 receives as inputs filter compensation coefficients used in the transfer function G(z), as will be further described below. As discussed above, the pulse-modulated waveform $PWM_k$ produced by the DPWM 36 is coupled to the gate terminals of the power switches 12, 14 through the respective drivers 22, 24.

Figure 2:
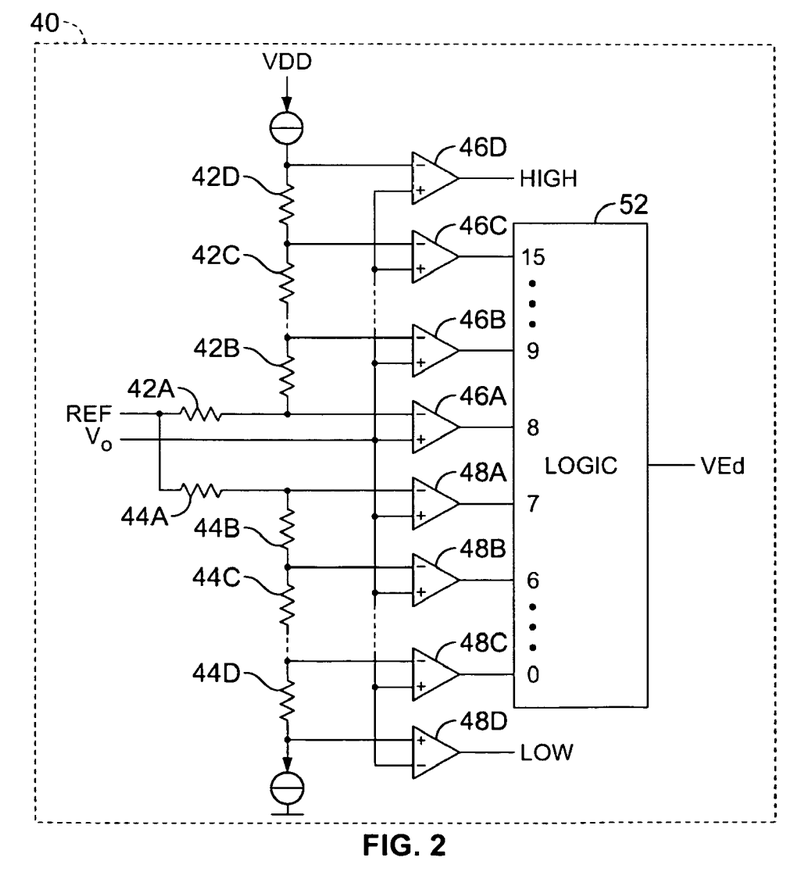
FIG. 2 depicts a windowed flash ADC that provides high and low saturation signals.

FIG. 2 depicts an exemplary windowed flash ADC 40 for use in the digital control circuit 30. The ADC 40 receives as inputs the voltage reference Ref and the output voltage $V_o$. The voltage reference is applied to the center of a resistor ladder that includes resistors 42A, 42B, 42C, 42D connected in series between the reference voltage terminal and a current source connected to a positive supply voltage ($V_{DD}$), and resistors 44A, 44B, 44C, 44D connected in series between the reference voltage terminal and a current source connected to ground. The resistors each have corresponding resistance values to define together with the current sources a plurality of voltage increments ranging above and below the voltage reference Ref. The magnitude of the resistance values and/or current sources can be selected to define the LSB resolution of the ADC 40. An array of comparators is connected to the resistor ladder, including a plurality of positive side comparators 46A, 46B, 46C, 46D and a plurality of negative side comparators 48A, 48B, 48C, 48D. The positive side comparators 46A, 46B, 46C, 46D each have a non-inverting input terminal connected to the output voltage $V_o$, and an inverting input terminal connected to respective ones of the resistors 42A, 42B, 42C, 42D. Likewise, the negative side comparators 48A, 48B, 48C each have a non-inverting input terminal connected to the output voltage $V_o$, and an inverting input terminal connected to respective ones of the resistors 44A, 44B, 44C, 44D. Negative side comparator 48D has a non-inverting input terminal connected to ground and the inverting input terminal connected to the output voltage $V_o$. It should be appreciated that a greater number of resistors and comparators may be included to increase the number of voltage increments and hence the range of the ADC 40, and that a limited number of resistors and comparators is shown in FIG. 2 for exemplary purposes only.

The ADC 40 further includes a logic device 52 coupled to output terminals of comparators 46A, 46B, 46C and 48A, 48B, 48C. The logic device 52 receives the comparator outputs and provides a multi-bit (e.g., 4-bit) parallel output representing the voltage error $VEd_k$. By way of example, an output voltage $V_o$ that exceeds the reference voltage Ref by one voltage increment (e.g., 5 mV) would cause the outputs of comparators 46B, 46A, 48A, 48B, and 48C to go high, while the outputs of comparators 46C, 46D and 48D remain low. The logic device 52 would interpret this as logic level 9 (or binary 1001) and produce an associated voltage error signal $VEd_k$. It should be understood that the voltage reference Ref is variable so as to shift the window of the ADC 40. If the output voltage $V_o$ exceeds the highest voltage increment of the resistor ladder, the output terminal of comparator 46D provides a HIGH saturation signal. Similarly, if the output voltage $V_o$ is lower than the lowest voltage increment of the resistor ladder, the output terminal of comparator 48D provides a LOW saturation signal.

Figure 3:
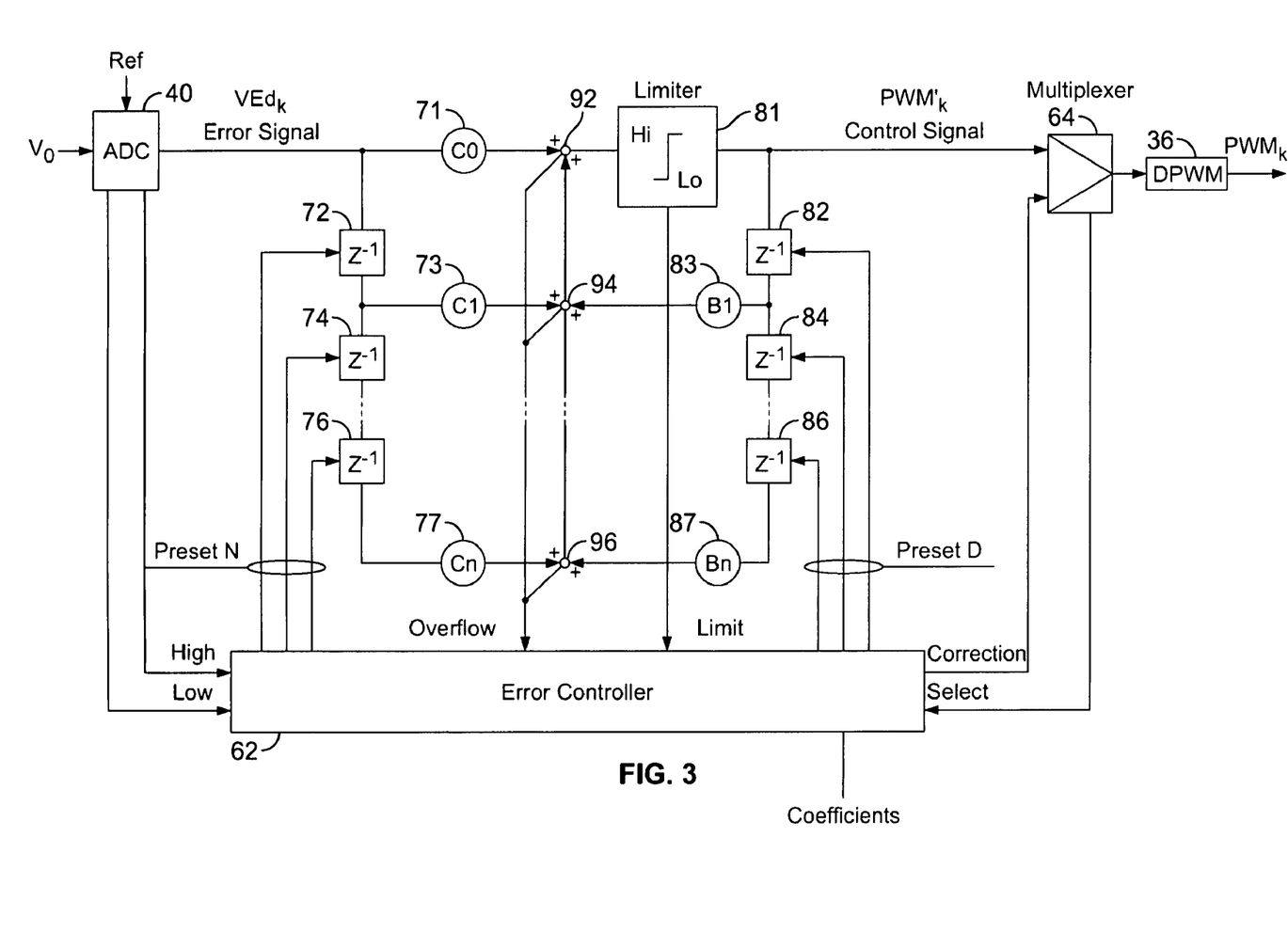
FIG. 3 depicts a digital controller having an infinite impulse response filter and error controller.

In FIG. 3, a digital controller having a digital filter and ADC 40 is depicted. The digital filter further comprises an infinite impulse response (IIR) filter that produces an output $PWM'_k$ from previous voltage error inputs $VEd_k$ and previous outputs $PWM'_k$. As discussed above, ADC 40 provides the voltage error inputs $VEd_k$. The digital filter outputs $PWM'_k$ are provided to the digital pulse width modulator (DPWM) 36, which provides the pulse width modulated control signal ($PWM_k$) to the power supply power switches.

The IIR filter is illustrated in block diagram form and includes a first plurality of delay registers 72, 74, . . . , 76 (each labeled $z^{-1}$), a first plurality of mathematical operators (multipliers) with coefficients 71, 73, . . . , 77 (labeled C0, C1, . . . , Cn), a second plurality of mathematical operators (adders) 92, 94, 96, a second plurality of delay registers 82, 84, . . . , 86 (each labeled $z^{-1}$), and a third plurality of mathematical operators (multipliers) with coefficients 83, 87 (labeled B1, . . . , Bn). Each of the first delay registers 72, 74, 76 holds a previous sample of the voltage error $VEd_k$, which is then weighted by a respective one of the coefficients 71, 73, 77. Likewise, each of the second delay registers 82, 84, 86 holds a previous sample of the output $PWM'_k$, which is then weighted by a respective one of the coefficients 83, 87. The adders 92, 94, and 96 combine the weighted input and output samples. It should be appreciated that a greater number of delay registers and coefficients may be included in the IIR filter, and that a limited number is shown in FIG. 3 for exemplary purposes only. The digital filter structure shown in FIG. 3 is an exemplary implementation of the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

The error controller 62 receives a plurality of input signals reflecting error conditions of the ADC 40 and the digital filter. Specifically, the error controller 62 receives the HIGH and LOW saturation signals from the ADC 40 reflecting that the output voltage $V_o$ is above and below the voltage window of the ADC, respectively. Each of the mathematical operators (adders) 92, 94, 96 provides an overflow signal to the error controller 62 reflecting an overflow condition (i.e., carry bit) of the mathematical operators. The digital filter further includes a range limiter 81 that clips the output $PWM'_k$ if upper or lower range limits are reached. In that situation, the range limiter 81 provides the error controller 62 with a corresponding limit signal.

The error controller 62 uses these input signals to alter the operation of the digital filter in order to improve the responsiveness of the digital filter to changing load conditions. The error controller 62 is coupled to each of the first plurality of delay registers 72, 74, 76 and second plurality of delay registers 82, 84, 86 to enable the resetting and/or presetting of the value stored therein. As used herein, "resetting" refers to the setting of the value to an initial value (e.g., zero), whereas "presetting" refers to the setting of the value to another predetermined number. Particularly, the error controller 62 can replace the previous samples of the voltage error $VEd_k$ and output $PWM'_k$ with predetermined values that change the behavior of the power supply. The error controller 62 receives as external inputs data values to be used as coefficients 71, 73, ..., 77 and 83, ..., 87. It should be appreciated that the characteristics of the digital filter can be programmed by selection of appropriate data values for the coefficients 71, 73, ..., 77 and 83, ..., 87.

The digital controller further includes multiplexer 64 that enables selection between the PWM'$_k$ output signal and a predetermined output signal provided by the error controller 62. A select signal provided by the error controller 62 determines which signal passes through the multiplexer 64. When the ADC 40 goes into HIGH or LOW saturation, the error controller 62 sets the PWM'$_k$ signal to a specific predetermined value (or sequence of values that are dependent in part on the previous samples) by controlling the multiplexer 64. In order to recover smoothly from such a condition, the error controller can also alter the delayed input and output samples by reloading the first plurality of delay registers 72, 74, 76, and second plurality of delay registers 82, 84, 86. This will assure a controlled behavior of the feedback loop as the ADC 40 recovers from saturation.

By way of example, if the ADC 40 experiences a positive saturation, i.e., the LOW signal changing from a low state to a high state, the PWM'$_k$ sample can be reset to zero to help to reduce the error. By resetting the PWM'$_k$ sample to zero, the pulse width delivered to the high side power switch 12 of the power supply 10 goes to zero, effectively shutting off power to the resistive load 20 (see FIG. 1). In order to recover from this situation smoothly, the samples PWM'$_{k-1}$, PWM'$_{k-2}$, ..., PWM'$_{k-n}$ can also be reset to zero or preset to another value in order to allow a smooth recovery. Likewise, if the ADC 40 experiences a negative saturation, i.e., the HIGH signal changing from a low state to a high state, the PWM'$_k$ sample can be preset to a maximum value to increase the pulse width delivered to the high side power switch 12 to reduce the error. Also, when an internal numeric overflow of the digital filter occurs, the error controller 62 can take actions to prevent uncontrolled command of the power switches of the power supply, such as altering the input and output samples of the digital filters.

In an embodiment of the invention, the switched mode power supply of FIG. 1 further comprises a point-of-load ("POL") regulator located at the point of power consumption within the electronic system. A power control system includes a plurality of like POL regulators, at least one data bus operatively connecting the plurality of POL regulators, and a system controller connected to the data bus and adapted to send and receive digital data to and from the plurality of POL regulators. The system controller would communicate data over the serial bus in order to program the digital filter transfer function G(z) with the values of the coefficients 71, 73, ..., 77 and 83, ..., 87.

Figure 4:
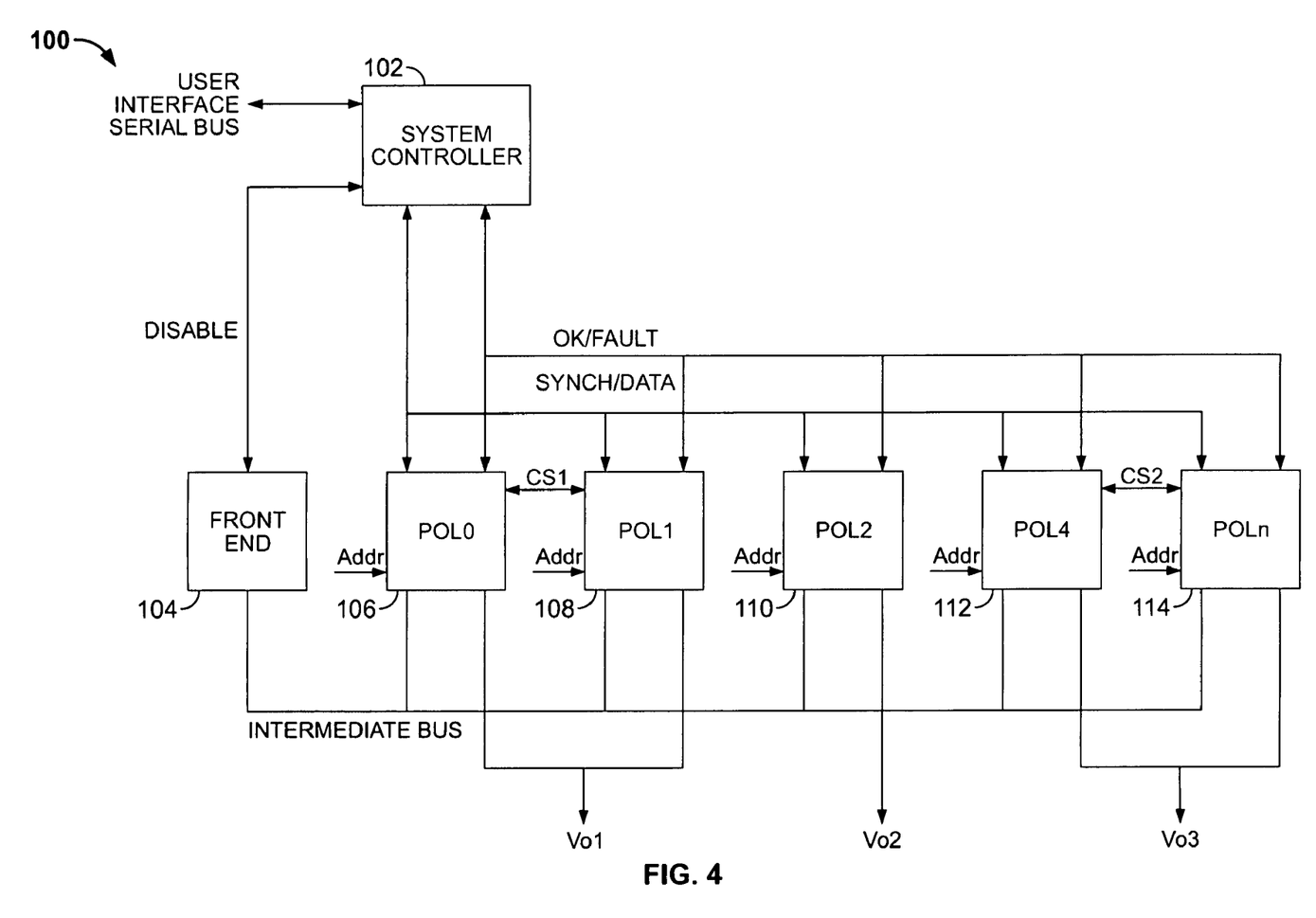
FIG. 4 depicts an exemplary control system for communicating filter compensation coefficients in accordance with an embodiment of the present invention.

Referring now to FIG. 4, a POL control system 100 is shown in accordance with an embodiment of the present invention. Specifically, the POL control system 100 includes a system controller 102, a front-end regulator 104, and a plurality of POL regulators 106, 108, 110, 112, and 114 arranged in an array. The POL regulators depicted herein include, but are not limited to, point-of-load regulators, power-on-load regulators, DC/DC converters, voltage regulators, and all other programmable voltage or current regulating devices generally known to those skilled in the art. An intra-device interface is provided between individual ones of the POL regulators to control specific interactions, such as current share or paralleling, e.g., current share interface (CS1) provided between POL0 106 and POL1 108, and CS2 provided between POL4 112 and POLn 114. In the exemplary configuration shown in FIG. 4, POL0 106 and POL1 108 operate in parallel mode to produce output voltage $V_{O1}$ with increased current capability, POL2 110 produces output voltage $V_{O2}$, and POL4 112 and POLn 114 operate in parallel mode to produce output voltage $V_{O3}$, though it should be appreciate that other combinations and other numbers of POL regulators could be advantageously utilized.

The front-end regulator 104 provides an intermediate voltage to the plurality of POL regulators over an intermediate voltage bus, and may simply comprise another POL regulator. The system controller 102 and front-end regulator 104 may be integrated together in a single unit, or may be provided as separate devices. Alternatively, the front-end regulator 104 may provide a plurality of intermediate voltages to the POL regulators over a plurality of intermediate voltage buses. The system controller 102 may draw its power from the intermediate voltage bus.

The system controller 102 communicates with the plurality of POL regulators by writing and/or reading digital data (either synchronously or asynchronous) via a uni-directional or bi-directional serial bus, illustrated in FIG. 4 as the synch/data bus. The synch/data bus may comprise a two-wire serial bus (e.g., I$^2$C) that allows data to be transmitted asynchronously or a single-wire serial bus that allows data to be transmitted synchronously (i.e., synchronized to a clock signal). In order to address any specific POL in the array, each POL is identified with a unique address, which may be hardwired into the POL or set by other methods. For example, the system controller 102 communicates data over the synch/data bus to program the digital filter transfer function G(z) coefficients of each POL regulator. The system controller 102 also communicates with the plurality of POL regulators for fault management over a second uni-directional or bi-directional serial bus, illustrated in FIG. 4 as the OK/fault bus. By grouping plural POL regulators together by connecting them to a common OK/fault bus allows the POL regulators have the same behavior in the case of a fault condition. Also, the system controller 102 communicates with a user system via a user interface bus for programming, setting, and monitoring of the POL control system 10. Lastly, the system controller 102 communicates with the front-end regulator 104 over a separate line to disable operation of the front-end regulator.

Figure 5:
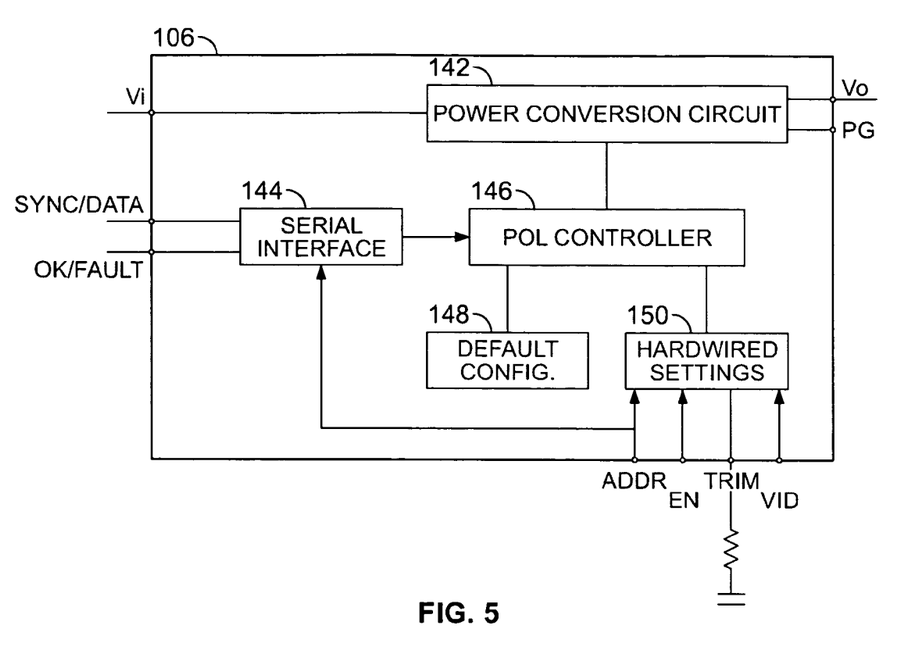
FIG. 5 depicts an exemplary POL regulator of the POL control system.

An exemplary POL regulator 106 of the POL control system 10 is illustrated in greater detail in FIG. 5. The other POL regulators of FIG. 4 have substantially identical configuration. The POL regulator 106 includes a power conversion circuit 142 (e.g., the switched mode power supply 10 of FIG. 1), a serial interface 144, a POL controller 146, default configuration memory 148, and hardwired settings interface 150. The power conversion circuit 142 transforms an input voltage ($V_i$) to the desired output voltage ($V_O$) according to settings received through the serial interface 144, the hardwired settings 150 or default settings. The power conversion circuit 142 may also include monitoring sensors for output voltage, current, temperature and other parameters that are used for local control and also communicated back to the system controller through the serial interface 144. The power conversion circuit 142 may also generate a Power Good (PG) output signal for stand-alone applications in order to provide a simplified monitoring function. The serial interface 144 receives and sends commands and messages to the system controller 102 via the synch/data and OK/fault serial buses. The default configuration memory 148 stores the default configuration for the POL regulator 106 in cases where no programming signals are received through the serial interface 144 or hardwired settings interface 150. The default configuration is selected such that the POL regulator 106 will operate in a "safe" condition in the absence of programming signals.

The hardwired settings interface 150 communicates with external connections to program the POL regulator without using the serial interface 144. The hardwired settings interface 150 may include as inputs the address setting (Addr) of the POL to alter or set some of the settings as a function of the address (i.e., the identifier of the POL), e.g., phase displacement, enable/disable bit (En), trim, VID code bits, and selecting different (pre-defined) sets of digital filter coefficients optimized for different output filter configurations. Further, the address identifies the POL regulator during communication operations through the serial interface 144. The trim input allows the connection of one or more external resistors to define an output voltage level for the POL regulator. Similarly, the VID code bits can be used to program the POL regulator for a desired output voltage/current level. The enable/disable bit allows the POL regulator to be turned on/off by toggling a digital high/low signal.

The POL controller 146 receives and prioritizes the settings of the POL regulator. If no settings information is received via either the hardwired settings interface 150 or the serial interface 144, the POL controller 146 accesses the parameters stored in the default configuration memory 148. Alternatively, if settings information is received via the hardwired settings interface 150, then the POL controller 146 will apply those parameters. Thus, the default settings apply to all of the parameters that cannot be or are not set through hard wiring. The settings received by the hardwired settings interface 150 can be overwritten by information received via the serial interface 144. The POL regulator can therefore operate in a stand-alone mode, a fully programmable mode, or a combination thereof. This programming flexibility enables a plurality of different power applications to be satisfied with a single generic POL regulator, thereby reducing the cost and simplifying the manufacture of POL regulators.

By way of example, the system controller 102 communicates data values to a particular POL regulator 106 via the synch/data bus for programming the digital filter coefficients. The data values are received by the serial interface 144 and communicated to the POL controller 146. The POL controller then communicates the data values to the power conversion circuit 142 along with suitable instructions to program the digital filter coefficients.

Figure 6:
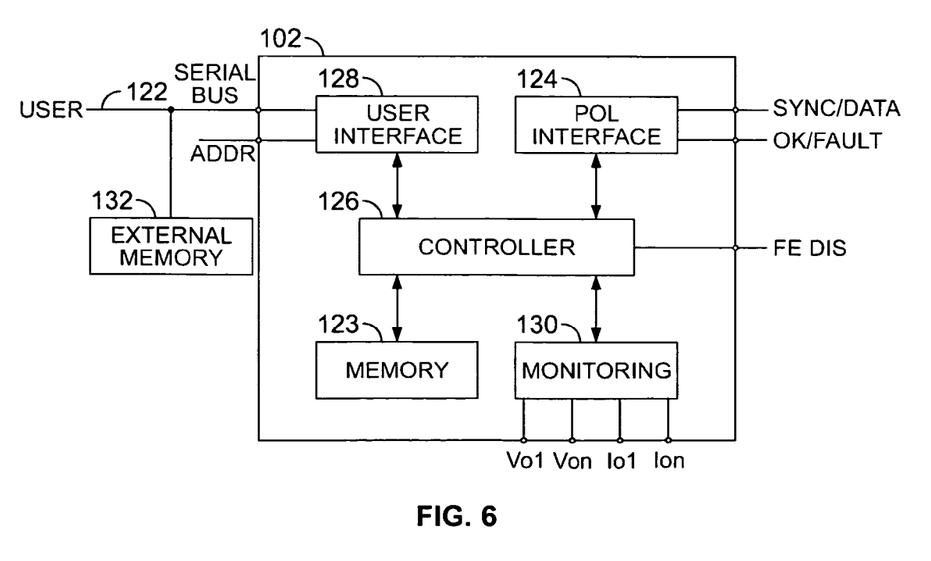
FIG. 6 depicts an exemplary system controller of the POL control system.

An exemplary system controller 102 of the POL control system 100 is illustrated in FIG. 6. The system controller 102 includes a user interface 122, a POL interface 124, a controller 126, and a memory 128. The user interface 122 sends and receives messages to/from the user via the user interface bus. The user interface bus may be provided by a serial or parallel bi-directional interface using standard interface protocols, e.g., an I$^2$C interface. User information such as monitoring values or new system settings would be transmitted through the user interface 122. The POL interface 124 transforms data to/from the POL regulators via the synch/data and OK/fault serial buses. The POL interface 124 communicates over the synch/data serial bus to transmit setting data and receive monitoring data, and communicates over the OK/fault serial bus to receive interrupt signals indicating a fault condition in at least one of the connected POL regulators. The memory 128 comprises a non-volatile memory storage device used to store the system set-up parameters (e.g., output voltage, current limitation set-point, timing data, etc.) for the POL regulators connected to the system controller 102. Optionally, a secondary, external memory 132 may also be connected to the user interface 122 to provide increased memory capacity for monitoring data or setting data.

The controller 126 is operably connected to the user interface 122, the POL interface 124, and the memory 128. The controller 126 has an external port for communication a disable signal (FE DIS) to the front-end regulator 104. At startup of the POL control system 100, the controller 126 reads from the internal memory 128 (and/or the external memory 132) the system settings and programs the POL regulators accordingly via the POL interface 124. Each of the POL regulators is then set up and started in a prescribed manner based on the system programming. During normal operation, the controller 126 decodes and executes any command or message coming from the user or the POL regulators. The controller 126 monitors the performance of the POL regulators and reports this information back to the user through the user interface 122. The POL regulators may also be programmed by the user through the controller 126 to execute specific, autonomous reactions to faults, such as over current or over voltage conditions. Alternatively, the POL regulators may be programmed to only report fault conditions to the system controller 102, which will then determine the appropriate corrective action in accordance with predefined settings, e.g., shut down the front-end regulator via the FE DIS control line.

A monitoring block 130 may optionally be provided to monitor the state of one or more voltage or current levels of other power systems not operably connected to the controller 102 via the synch/data or OK/fault buses. The monitoring block 130 may provide this information to the controller 126 for reporting to the user through the user interface in the same manner as other information concerning the POL control system 10. This way, the POL control system 10 can provide some backward compatibility with power systems that are already present in an electronic system.

As discussed above, the system controller 102 has an interface for communicating with a user system for programming and monitoring performance of the POL control system. The user system would include a computer coupled to the interface, either directly or through a network, having suitable software adapted to communicate with the system controller 102. As known in the art, the computer would be equipped with a graphics-based user interface (GUI) that incorporates movable windows, icons and a mouse, such as based on the Microsoft Windows™ interface. The GUI may include standard preprogrammed formats for representing text and graphics, as generally understood in the art. Information received from the system controller 102 is displayed on the computer screen by the GUI, and the user can program and monitor the operation of the POL control system by making changes on the particular screens of the GUI.

Figure 7:
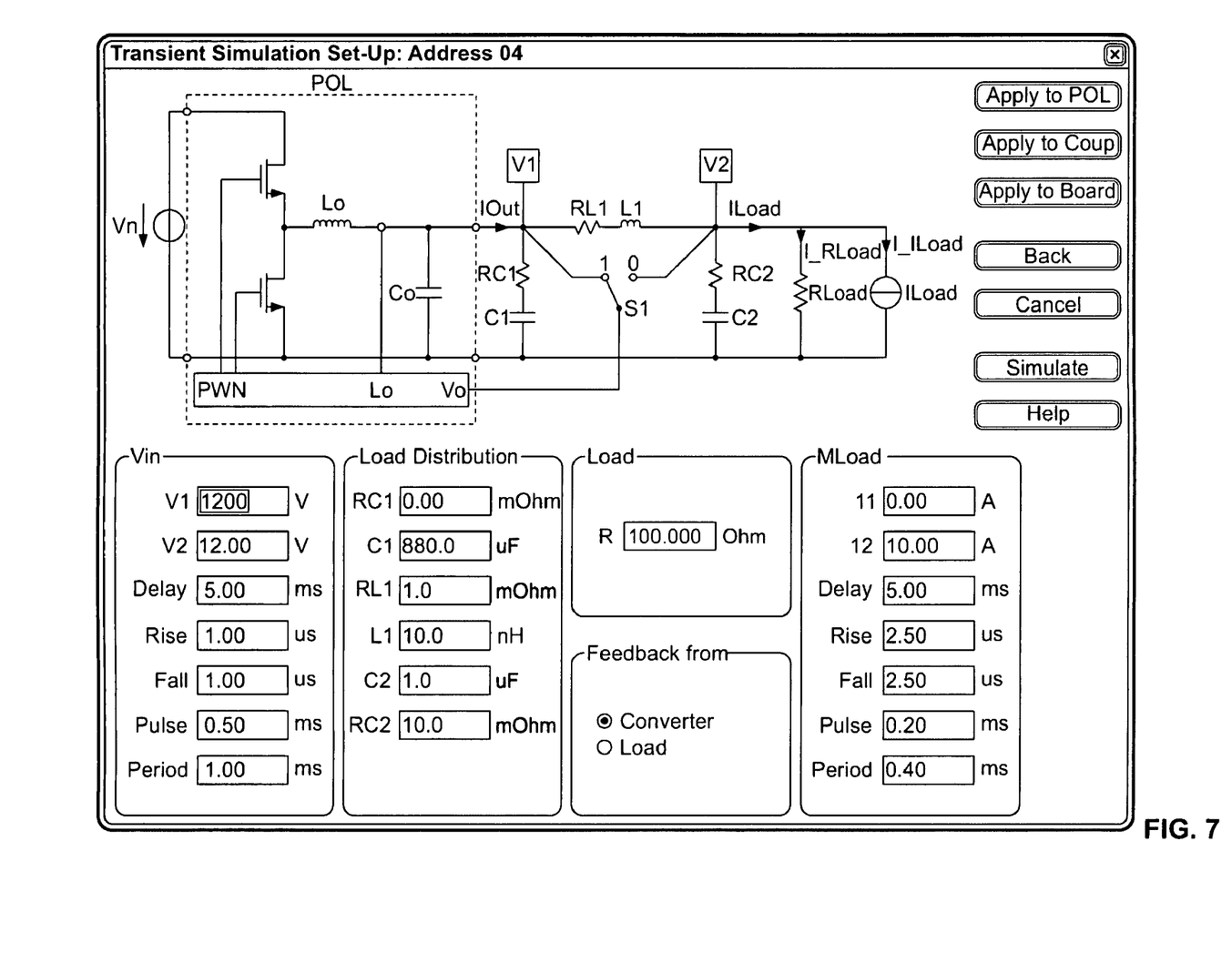
FIG. 7 is an exemplary screen shot depicting a graphical user interface (GUI) for simulating operation of a POL regulator.

FIG. 7 illustrates an exemplary screen shot of a GUI used for simulating operation of a POL regulator. The screen shot illustrates a POL regulator having a topology corresponding to the exemplary switched mode power supply 10 described above with respect to FIG. 1. The POL regulator includes a pair of power switches provided by MOSFET devices, an output inductor $L_O$, and a capacitor $C_O$ 18. Output terminals of the POL regulator are coupled to a load resistance $R_L$ through a pi-filter defined by a series inductance $L_1$ and internal resistance $RL_1$, capacitance $C_1$ and internal resistance $RC_1$ at a first end of the pi-filter, and capacitance $C_2$ and internal resistance $RC_2$ at a second end of the pi-filter. The POL regulator further includes a control circuit that provides a PWM drive signal to the power switches, and receives as feedback signals the output current $IL_O$ and output voltage $V_O$. The output voltage may be sensed from either end of the transmission line by setting a switch.

The GUI permits a user to define values of various parameters of the POL regulator in order to simulate its operation. Each user definable parameter includes a field that permits a user to enter desired data values. The user can select parameters of the output voltages, such as by defining the voltage at the first end of the pi-filter $V_1$, the voltage at the second end of the pi-filter $V_2$, voltage delay, rise and fall times, and power switch drive pulse width and period. The user can also select load distribution parameters, including defining the resistances, capacitances and inductance of the pi-filter. The user can also define the load resistance and load current characteristics.

Figure 8:
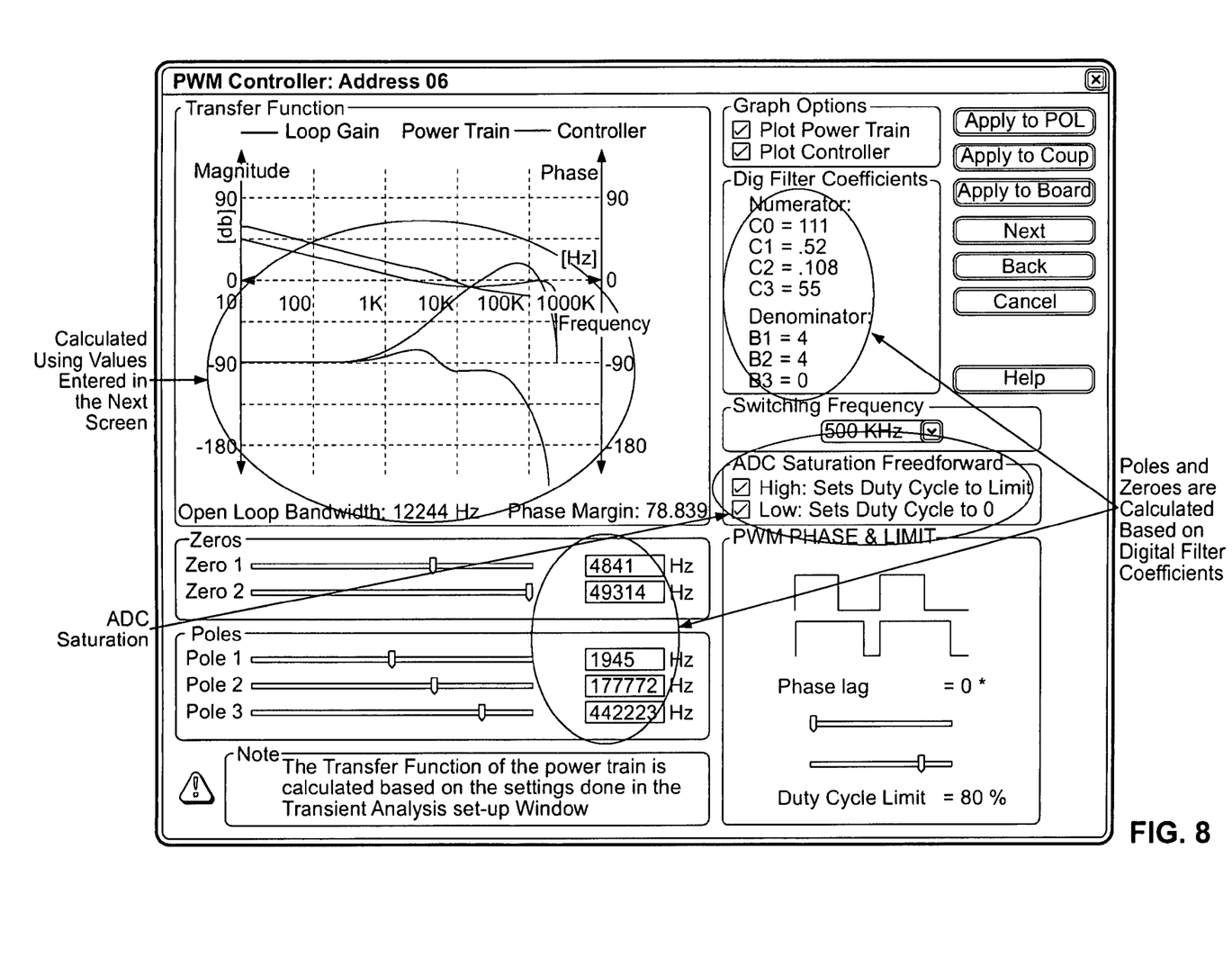
FIG. 8 is an exemplary screen shot depicting a GUI for programming the compensation coefficients of the digital controller.

Once the user has selected desired parameters for the POL regulator, the GUI can run a simulation based on the selected parameters. FIG. 8 illustrates an exemplary screen shot of a GUI in which the transfer function G(z) for the POL regulator is shown graphically. The transfer function is illustrated graphically in terms of variations of gain magnitude and phase with respect to frequency. As part of the simulation, the filter coefficients are calculated for the digital filter of the digital PWM and displayed on the screen. The user can alter the shape of the gain plots using slide potentiometers that adjust the poles and zeros of the transfer function, and can repeat the simulation of the POL regulator until satisfied with the performance results. The user can then opt to apply the selected digital filter coefficients to an individual POL regulator or group of POL regulators or all groups of POL regulators on a particular printed circuit board by selection of an appropriate button. This action would cause the selected filter coefficients to be stored in non-volatile memory contained within the system controller 102, and in turn communicated to each appropriate POL regulator via the synch/data bus as discussed above.

Having thus described a preferred embodiment of a system and method for programming the digital filter compensation coefficients of a digitally controlled switched mode power supply within a distributed power system, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A point-of-load regulator comprising:
   a power conversion circuit for converting an intermediate voltage to an output voltage, said power conversion circuit comprising at least one power switch for conveying power to a load and a digital controller for controlling operation of said at least one power switch responsive to a feedback measurement, said digital controller further comprising:
      a digital filter having a transfer function defined by plural filter coefficients;
      an analog-to-digital converter providing a digital error signal representing a difference between said output measurement and a reference value, said digital filter providing a digital control output based on a sum of current and previous error signals and previous control outputs;
      an error controller for modifying operation of said digital filter upon an error condition; and
      a digital pulse width modulator providing a control signal to said at least one power switch, said control signal having a pulse width corresponding to said digital control output;
   a serial data bus interface for communicating programming information from an external serial data bus connected thereto; and
   a controller connected to said serial data bus interface and said power conversion circuit, said controller being used to determine said plural filter coefficients from programming data received via said serial data bus interface.

2. The point-of-toad regulator of claim 1, wherein said analog-to-digital converter further comprises a windowed flash analog-to-digital converter.

3. The point-of-load regulator of claim 2, wherein said windowed flash analog-to-digital converter provides a HIGH signal reflecting a negative saturation of said analog-to-digital converter and a LOW signal reflecting a positive saturation of said analog-to-digital converter.

4. The point-of-load regulator of claim 1, wherein said digital filter further comprises an infinite impulse response filter.

5. The point-of-load regulator of claim 4, wherein said infinite impulse response filter provides the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

wherein PWM(z) is the digital control output, VEd(z) is the error signal, $C_0 \ldots C_n$ are input side coefficients, and $B_1 \ldots B_n$ are output side coefficients.

6. The point-of-load regulator of claim 1, wherein said digital filter further comprises a range limiter for clipping said digital control output if upper or lower range limits are reached.

7. The point-of-load regulator of claim 6, wherein said range limiter provides a limit signal to said error controller if said upper or lower range limits are reached.

8. The point-of-load regulator of claim 1, wherein said digital controller further comprises a multiplexer coupled to said error controller and to said digital filter, said error controller providing an alternative digital control output to said multiplexer that passes to said digital pulse width modulator upon said error condition.

9. The point-of-load regulator of claim 1, wherein said error controller is further used to preset at least one of said previous error signals with predetermined values upon said error condition.

10. The point-of-load regulator of claim 1, wherein said error controller is further adapted used to preset at least one of said previous control outputs with predetermined values upon said error condition.

11. The point-of-load regulator of claim 1, wherein said error controller is further used to reset at least one of said previous error signals to initial values upon said error condition.

12. The point-of-load regulator of claim 1, wherein said error controller is further used to reset at least one of said previous control outputs to initial values upon said error condition.

13. The point-of-load regulator of claim 1, wherein said error condition further comprises a saturation of said analog-to-digital converter.

14. The point-of-load regulator of claim 1, wherein said error condition further comprises a mathematical overflow of said digital filter.

* * * * *